United States Patent
Zhang et al.

(10) Patent No.: US 8,515,466 B2
(45) Date of Patent: Aug. 20, 2013

(54) SCHEDULING BASED ON RISE-OVER-THERMAL IN A WIRELESS COMMUNICATION SYSTEM

(75) Inventors: Danlu Zhang, San Diego, CA (US); Bibhu Mohanty, San Diego, CA (US); Sharad Deepak Sambhwani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 902 days.

(21) Appl. No.: 12/031,245

(22) Filed: Feb. 14, 2008

(65) Prior Publication Data
US 2008/0198802 A1   Aug. 21, 2008

Related U.S. Application Data

(60) Provisional application No. 60/890,418, filed on Feb. 16, 2007, provisional application No. 60/913,789, filed on Apr. 24, 2007, provisional application No. 60/913,778, filed on Apr. 24, 2007.

(51) Int. Cl.
   *H04W 72/00*   (2009.01)
(52) U.S. Cl.
   USPC .......................................... 455/464; 370/329
(58) Field of Classification Search
   USPC ............. 455/464, 453, 450, 63.1, 525, 452.1, 455/67.13; 370/332, 329, 338
   See application file for complete search history.

(56) References Cited

U.S. PATENT DOCUMENTS

| | | | |
|---|---|---|---|
| 3,824,597 A | 7/1974 | Berg | |
| 4,054,785 A | 10/1977 | Lehmann | |
| 5,734,967 A | 3/1998 | Kotzin et al. | |
| 5,952,834 A * | 9/1999 | Buckley | ........................ 324/613 |
| 6,036,351 A | 3/2000 | Wagstaff | |
| 6,317,600 B1 | 11/2001 | Salonaho et al. | |

(Continued)

FOREIGN PATENT DOCUMENTS

| | | |
|---|---|---|
| EP | 1708536 | 10/2006 |
| JP | 2004312333 A | 11/2004 |

(Continued)

OTHER PUBLICATIONS

International Search Report—PCT/US08/054178, International Search Authority—European Patent Office. Sep. 8, 2008.

(Continued)

*Primary Examiner* — Charles Appiah
*Assistant Examiner* — Alexander Yi
(74) *Attorney, Agent, or Firm* — Darren M. Simon

(57) ABSTRACT

Techniques for scheduling users for transmission on the uplink in a wireless communication system are described. In one design, a total load for a cell may be determined based on a rise-over-thermal (RoT) measurement. An in-cell load for users served by the cell may be determined based on uplink transmissions received from these users. An outside load due to users in neighbor cells may be determined based on the total load and the in-cell load. A target total load for the cell may be determined based on a target RoT for the cell. An available load for the cell may be determined based on the target total load for the cell and the outside load. Users in the cell may be scheduled for transmission on the uplink based on the available load for the cell.

40 Claims, 7 Drawing Sheets

(56) References Cited

U.S. PATENT DOCUMENTS

| | | | |
|---|---|---|---|
| 6,397,041 B1 | 5/2002 | Ballard et al. | |
| 6,442,398 B1 * | 8/2002 | Padovani et al. | 455/522 |
| 6,577,875 B1 | 6/2003 | Brouwer | |
| 6,643,520 B1 | 11/2003 | Park et al. | |
| 6,731,620 B1 | 5/2004 | Lim et al. | |
| 7,042,966 B1 | 5/2006 | Lapaille et al. | |
| 7,046,694 B2 | 5/2006 | Kumar | |
| 7,373,163 B2 | 5/2008 | Kim et al. | |
| 7,447,504 B2 * | 11/2008 | Lohr et al. | 455/450 |
| 2004/0022207 A1 | 2/2004 | Leung et al. | |
| 2004/0121808 A1 | 6/2004 | Hen et al. | |
| 2004/0228349 A1 * | 11/2004 | Vrzic et al. | 370/395.4 |
| 2005/0026624 A1 | 2/2005 | Gandhi et al. | |
| 2005/0047365 A1 | 3/2005 | Hong et al. | |
| 2005/0192042 A1 | 9/2005 | Au et al. | |
| 2005/0273320 A1 | 12/2005 | Yamaguchi et al. | |
| 2006/0176983 A1 | 8/2006 | Wadsworth et al. | |
| 2006/0211441 A1 | 9/2006 | Mese et al. | |
| 2007/0202826 A1 | 8/2007 | Dean | |
| 2007/0237067 A9 | 10/2007 | Borran et al. | |
| 2007/0270100 A1 | 11/2007 | Agrawal et al. | |
| 2008/0095277 A1 | 4/2008 | Cheng | |
| 2008/0267086 A1 | 10/2008 | Wheatley et al. | |
| 2009/0088146 A1 | 4/2009 | Wigren et al. | |

FOREIGN PATENT DOCUMENTS

| | | | |
|---|---|---|---|
| JP | 2006345500 A | 12/2006 | |
| JP | 2007536800 A | 12/2007 | |
| JP | 2008535312 A | 8/2008 | |
| KR | 1020040045102 | 6/2004 | |
| KR | 20060041674 A | 5/2006 | |
| RU | 2277300 C2 | 5/2006 | |
| WO | WO0241528 | 5/2002 | |
| WO | WO03094395 | 11/2003 | |
| WO | WO2004034615 | 4/2004 | |
| WO | WO2005022773 A1 | 3/2005 | |
| WO | 2005094112 | 10/2005 | |
| WO | 2005112485 A2 | 11/2005 | |
| WO | WO2006038786 | 4/2006 | |
| WO | WO2006104347 A1 | 10/2006 | |

OTHER PUBLICATIONS

Written Opinion—PCT/US08/054178, International Search Authority—European Patent Office, Sep. 8, 2008.
"Overload Indicator Command Triggering," 3GPP TSG-RAN WG2 #45 BIS, R2-050172, Jan. 10, 2005, pp. 1-4.
"3GPP—3rd Generation Partnership Project; Technical Specification Group Radio Access Network; FDD Enhanced Uplink; Overall description; Stage 2 (Release 6)," 3rd Generation Partnership Project; Technical Specification, vol. 3GPP TS 25.309, No. V6.2.0, Mar. 1, 2005, pp. 1-30.
"3rd Generation Partnership Project 2 '3GPP2' CDMA2000 High Rate Packet Data Air Interface Specification," 3GPP2C.S0024 Version 3.0, Dec. 5, 2001.
International Search Report, PCT/US2005/004981, International Search Authority—EPO, Jun. 15, 2005.
Drawings of U.S. Appl. No. 60/852,955 to Lixin Cheng filed Oct. 19, 2006, pp. 1-6.
Specification of U.S. Appl. No. 60/852,955 to Lixin Cheng filed Oct. 19, 2006, pp. 1-7.
Taiwan Search Report—TW097105662—TIPO—Jul. 4, 2011.
Translation of Office Action in Korean application 10-2009-7024498 corresponding to U.S. Appl. No. 12/107,013, citing KR1020060041674 and KR1020040045102 dated Feb. 11, 2011.
Nean Lund, "Methods of measuring adjacent-band radiation from radio transmitters", Proceedings of the I.R.E., Sep. 18, 2006, pp. 653-656, Retrieved from the Internet: URL:http://www.ieeexplore.ieee.org, [retrieved on Mar. 8, 2011].

* cited by examiner

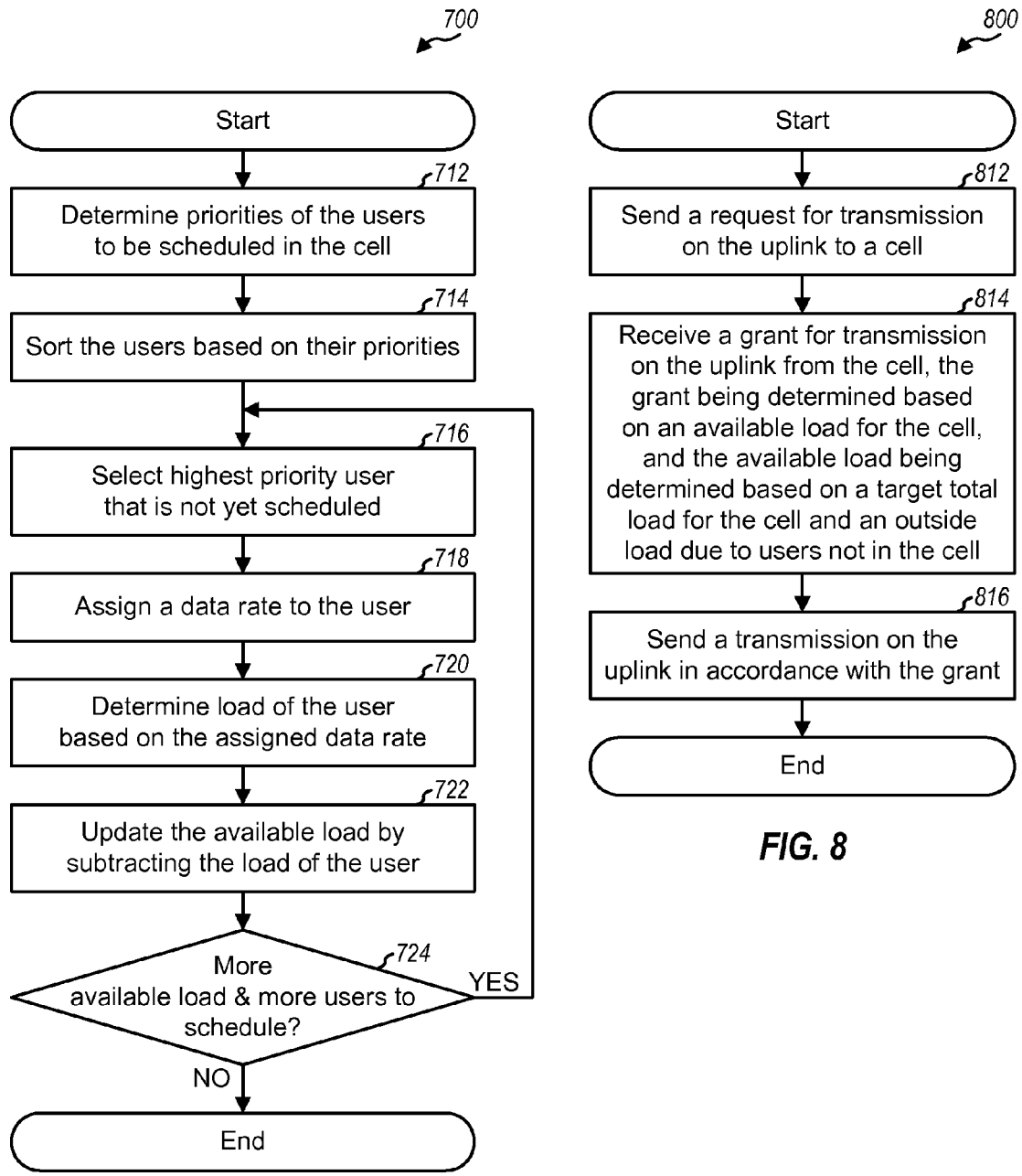

SCHEDULING BASED ON RISE-OVER-THERMAL IN A WIRELESS COMMUNICATION SYSTEM

I. CLAIM OF PRIORITY UNDER 35 U.S.C. §119

The present Application for Patent claims priority to Provisional U.S. Application Ser. No. 60/890,418, entitled "ROT Based Scheduling in W-CDMA Uplink," filed Feb. 16, 2007, Provisional U.S. Application Ser. No. 60/913,789, entitled "ROT Based Scheduling in W-CDMA Uplink," filed Apr. 24, 2007, and Provisional U.S. Application Ser. No. 60/913,778, entitled "A Method to Estimate Rise over Thermal (ROT) in W-CDMA," filed Apr. 24, 2007, all assigned to the assignee hereof, and expressly incorporated herein by reference.

BACKGROUND

I. Field

The present disclosure relates generally to communication, and more specifically to techniques for scheduling users in a wireless communication system.

II. Background

Wireless communication systems are widely deployed to provide various communication services such as voice, video, packet data, messaging, broadcast, etc. These systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

In a CDMA communication system, multiple user equipments (UEs) may currently transmit on the uplink to a Node B. The transmission from each UE acts as interference to the transmissions from other UEs at the Node B. The received signal quality of a given UE may be dependent on various factors such as the amount of transmit power used by the UE, the path loss from the UE to the Node B, the amount of interference observed by the UE at the Node B, etc. The received signal quality of the UE may be improved by increasing the transmit power of the UE. However, the higher transmit power of the UE would increase the amount of interference to other UEs, each of which may need to increase its transmit power in order to maintain the desired received signal quality for that UE.

The UEs may be intermittently active on the uplink and may transmit sporadically whenever there is data to send. The UEs may be scheduled for transmission on the uplink whenever they have data to send. The scheduling may be challenging due to the interference between the uplink transmissions from different UEs.

SUMMARY

Techniques for scheduling users for transmission on the uplink in a wireless communication system are described herein. In an aspect, users may be scheduled by taking into account rise-over-thermal (RoT) at a cell, which may improve capacity. In one design, a total load for the cell may be determined based on an RoT measurement. An in-cell load for users served by the cell may be determined based on uplink transmissions received from these users. An outside load due to users in neighbor cells may be determined based on the total load and the in-cell load. A target total load for the cell may be determined based on a target RoT for the cell. An available load for the cell may be determined based on the target total load for the cell and the outside load. Users in the cell may be scheduled for transmission on the uplink based on the available load for the cell.

In one design, the users may be scheduled, one user at a time, based on their priorities. A data rate may be assigned to a user based on a power headroom and a queue size of the user. The load of the user may be determined based on the assigned data rate and other pertinent information. The available load may be updated by subtracting the load of the user. Another user may be scheduled in similar manner based on the updated available load.

Various aspects and features of the disclosure are described in further detail below.

BRIEF DESCRIPTION OF THE DRAWINGS

FIG. 7 shows a process for scheduling users based on the available load.

FIG. 8 shows a process performed by a UE for uplink transmission.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (W-CDMA) and other CDMA variants. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.20, IEEE 802.16 (WiMAX), 802.11 (WiFi), Flash-OFDM®, etc. UTRA and E-UTRA are part of Universal Mobile Telecommunication System (UMTS). 3GPP Long Term Evolution (LTE) is an upcoming release of UMTS that uses E-UTRA. UTRA, E-UTRA, UMTS, LTE and GSM are described in documents from an organization named "3rd Generation Partnership Project" (3GPP). cdma2000 and UMB are described in documents from an organization named "3rd Generation Partnership Project 2" (3GPP2). These various radio technologies and standards are known in the art. For clarity, certain aspects of the techniques are described below for UMTS, and UMTS terminology is used in much of the description below.

Figure 1:
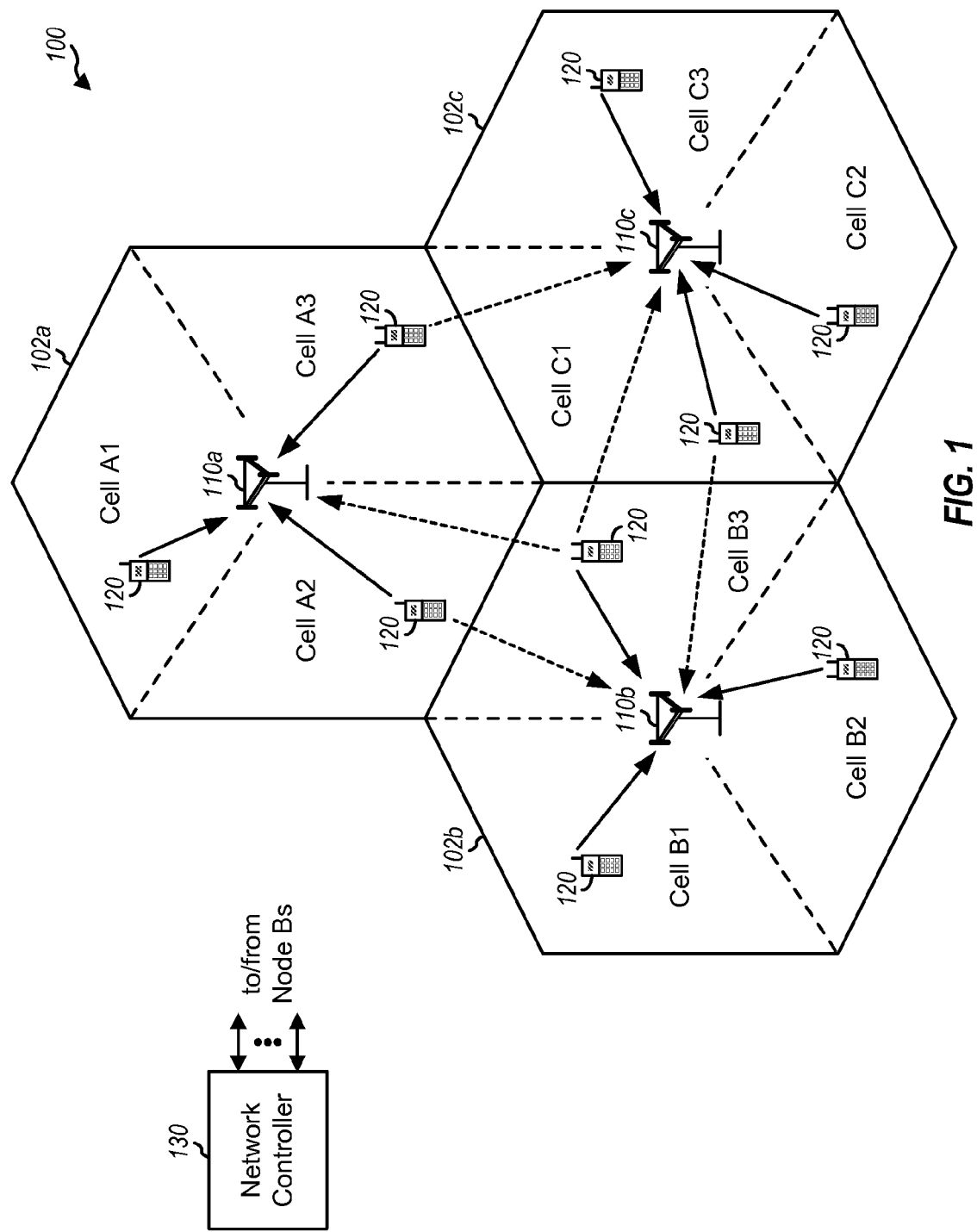
FIG. 1 shows a wireless communication system.

FIG. 1 shows a wireless communication system 100, which may be a Universal Terrestrial Radio Access Network (UTRAN) in UMTS. System 100 includes multiple Node Bs 110. A Node B is a fixed station that communicates with the UEs and may also be referred to as an evolved Node B (eNB), a base station, an access point, etc. Each Node B 110 provides communication coverage for a particular geographic area 102 and supports communication for the UEs located within the coverage area. The coverage area of a Node B may be partitioned into multiple (e.g., three) smaller areas, and each smaller area may be served by a respective Node B subsystem. The term "cell" can refer to the smallest coverage area of a Node B and/or a Node B subsystem serving this coverage area, depending on the context in which the term is used. In the example shown in FIG. 1, Node B 110a serves cells A1, A2 and A3, Node B 110b serves cells B1, B2 and B3, and Node B 110c serves cells C1, C2 and C3.

A network controller 130 may couple to Node Bs 110 and provide coordination and control for these Node Bs. Network controller 130 may be a single network entity or a collection of network entities.

UEs 120 may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless communication device, a handheld device, a wireless modem, a laptop computer, etc. A UE may communicate with a Node B via transmissions on the downlink and uplink. The downlink (or forward link) refers to the communication link from the Node B to the UE, and the uplink (or reverse link) refers to the communication link from the UE to the Node B. For clarity, FIG. 1 shows only uplink transmissions from UEs 120 to Node Bs 110. In FIG. 1, a solid line with a single arrow indicates a transmission to a serving cell, and a dashed line with a single arrow indicates a transmission to a non-serving cell. The terms "UE" and "user" are used interchangeably herein.

3GPP Release 6 and later supports High-Speed Uplink Packet Access (HSUPA), which is a set of channels and procedures that enable high-speed packet data transmission on the uplink. For HSUPA, a user may send a scheduling information (SI) message containing information on queue size and power headroom for the user. This information may be translated into a maximum data rate that can be supported by the user on the uplink. A scheduler may schedule the user for transmission on the uplink and may send a grant on an E-DCH Absolute Grant Channel (E-AGCH) or an E-DCH Relative Grant Channel (E-RGCH) to the user. The user may have an active set containing a serving cell and zero or more non-serving cells. The serving cell may send (i) an absolute grant on the E-AGCH to indicate an amount of transmit power that the user may use for transmission on the uplink or (ii) a relative grant on the E-RGCH to indicate a change from the current grant, e.g., an increase or decrease of the current grant by some amount. Each non-serving cell may track the user and may only send a relative grant to decrease the current grant.

HSUPA supports hybrid automatic retransmission (HARQ) on the uplink. For HARQ, a user may send a transmission of a packet to a serving cell and may send zero or more retransmissions of the packet until an acknowledgement (ACK) is received for the packet, or the maximum number of retransmissions has been sent, or the packet is terminated for some other reason. A retransmission of a pending packet has higher priority than a transmission of a new packet in HSUPA. A pending packet is a packet that has been sent but is decoded in error.

As shown in FIG. 1, each cell may receive transmissions from users served by that cell as well as transmissions from users not served by the cell. The total interference observed at each cell is composed of (1) intra-cell interference from users within the same cell and (2) inter-cell interference from users in other cells. The inter-cell interference and intra-cell interference have a large impact on performance and may be taken into account in scheduling users, as described below.

On the uplink in system 100, the transmission from each user acts as interference to the transmissions from other users. Hence, when a new user is scheduled on the uplink, the transmission from this user increases the interference to other users. The amount of interference caused by the new user may be dependent on various factors such as the amount of transmit power used by the user, the path loss from the user to the cell, etc. To combat the increased interference, each remaining user may increase its transmit power, which may further increase interference at the cell. As more users are added, other active users may need to increase their transmit power, and the total interference at the cell may increase. At some point, no more users may be added. The system may thus be interference-limited on the uplink.

Figure 2:
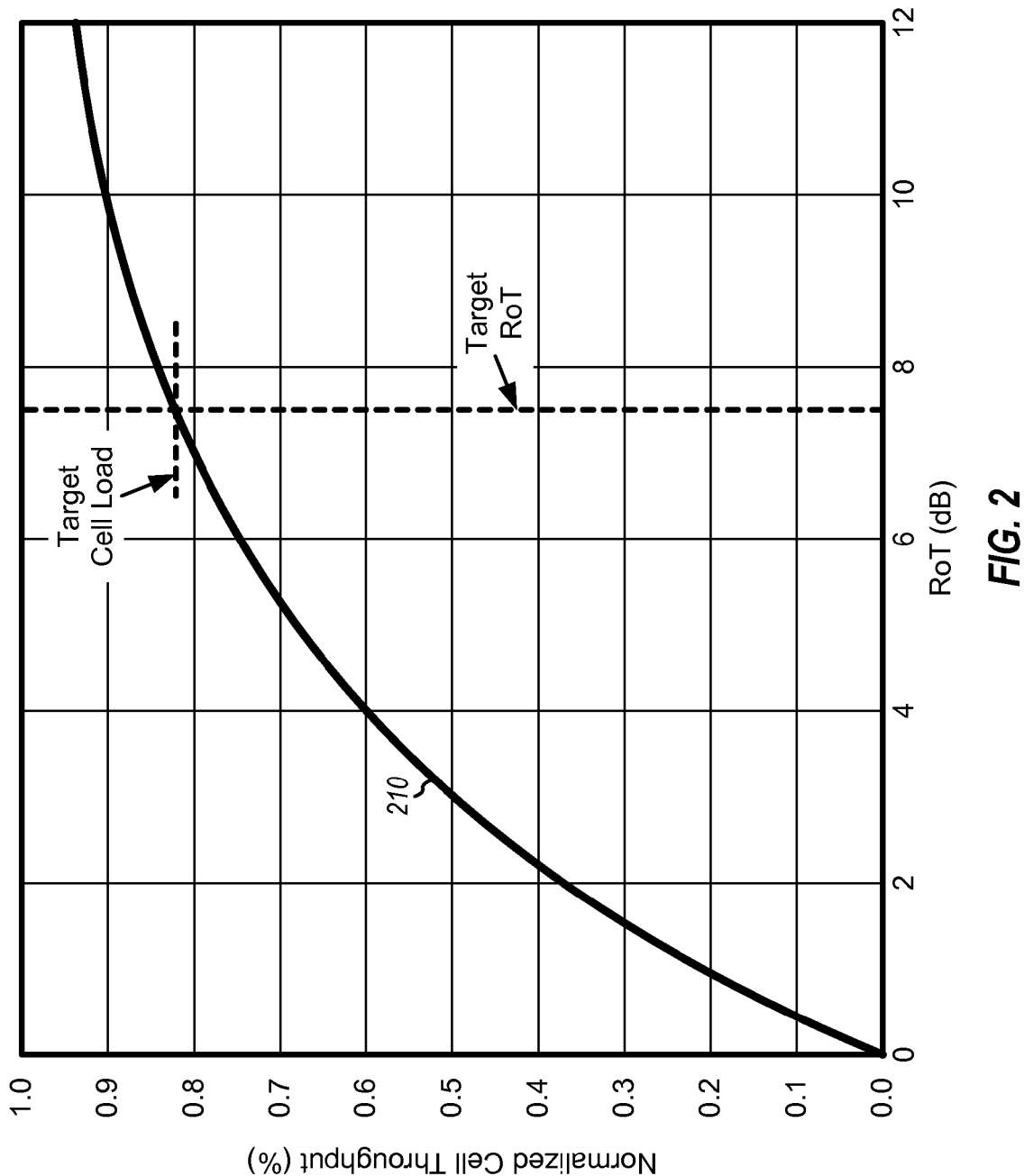
FIG. 2 shows a plot of normalized cell throughput versus RoT.

FIG. 2 shows a plot 210 of normalized cell throughput versus RoT for the uplink. RoT is a ratio of total noise and interference to thermal noise at a cell. Normalized cell throughput is the total throughput of all users on the uplink divided by the maximum total throughput. As shown in FIG. 2, cell throughput increases by a larger percentage at low RoT and asymptotically reaches a maximum value at high RoT.

RoT is a fundamental measure of loading on the uplink. RoT may be maintained below a certain target level in order to avoid system instability. RoT may fluctuate depending on the number of users scheduled on the uplink and the data rates of the scheduled UEs.

In an aspect, users may be scheduled for transmission on the uplink by taking into account RoT at a cell. In one design, the RoT of the cell may be measured and used to determine a total load for the cell. An outside load due to users in neighbor cells may be determined based on the total load and an in-cell load for users served by the cell. A target total load for the cell may be determined based on a target RoT for the cell. An available load for the cell may be determined based on the target total load and the outside load and may be allocated to the users in the cell. The RoT may thus be used to determine the outside load as well as the available load for the cell. These various loads are described in further detail below.

A total-energy-per-chip-to-total-noise ratio, $(E_c/N_t)_i$, for a given user i at a given cell may be expressed as:

$$(E_c/N_t)_i = (E_{cp}/N_t)_i \cdot (1 + O2P_i + T2P_i), \qquad \text{Eq (1)}$$

where $E_{cp}$ is an energy-per-chip for pilot, $E_c$ is a total-energy-per-chip for data, overhead, and pilot, $N_t$ is total noise and interference observed by user i, $O2P_i$ (or $\text{Gain}_{overhead}$) is an overhead-to-pilot ratio for user i, and $T2P_i$ is a traffic-to-pilot ratio for user i.

A pilot-energy-per-chip-to-total-noise ratio, $(E_{cp}/N_t)_i$, for user i may be estimated based on pilot transmitted by user i on the uplink. User i may transmit overhead or signaling at a power level determined by $O2P_i$ and may transmit data at a power level determined by $T2P_i$, with $O2P_i$ being the ratio of the signaling power level to the pilot power level and $T2P_i$ being the ratio of the data power level to the pilot power level. The pilot power level may be adjusted via power control to achieve a desired level of performance, e.g., a target packet error rate (PER). The ratios $O2P_i$ and $T2P_i$ may be known or may be determined for user i. $(E_c/N_t)_i$ for user i may then be computed based on the estimated $(E_{cp}/N_t)$ and the known $O2P_i$ and $T2P_i$.

The load of user i may be expressed as:

$$L_i = \frac{(E_c)_i}{I_0} = \frac{(E_c/N_t)_i}{1+(E_c/N_t)_i}, \quad \text{Eq (2)}$$

where ($E_c)_i$ is a total-energy-per-chip for user i, $I_0$ is the total noise and interference observed by the cell, and $L_i$ is the load of user i.

The total noise and interference, $I_0$, observed by the cell may be expressed as:

$$I_0 = \sum_i (E_c)_i + N_0, \quad \text{Eq (3)}$$

where $N_0$ is the thermal noise observed by the cell.

The total noise and interference, $(N_t)_i$, observed by user i may be expressed as:

$$(N_t)_i = I_0 - (E_c)_i. \quad \text{Eq (4)}$$

The second equality in equation (2) may be obtained by dividing $(E_c)_i$ by $(N_t)_i$, dividing $I_0$ by $(N_t)_i$, and substituting $I_0$ with $(N_t)_i + (E_c)_i$ from equation (4).

The uplink transmission from user i may be processed with a rake receiver or an equalizer at the cell. For the rake receiver, one or more fingers may be assigned to user i, and each finger may process a different signal path for user i. In this case, $(E_c/N_t)_i$ may be estimated by each assigned finger, the load for each finger may be computed based on the estimated $(E_c/N_t)_i$ as shown in equation (2), and the loads for all assigned fingers may be summed to obtain the load $L_i$ of user i. For the equalizer, the load $L_i$ of user i may be computed based on a load equation defined for the equalizer.

The load of all users served by the cell, $L_{in\text{-}cell}$, may be expressed as:

$$L_{in\text{-}cell} = \sum_{i \in Cell} L_i, \quad \text{Eq (5)}$$

where Cell is a set of all users served by the cell. $L_{in\text{-}cell}$ may also be referred to as the in-cell load.

The load of all users not served by the cell but have the cell in their active sets, $L_{ns,AS}$, may be expressed as:

$$L_{ns,AS} = \sum_{\substack{i \notin Cell \\ i \in ActiveSet}} L_i, \quad \text{Eq (6)}$$

where ActiveSet is a set of all users having the cell in their active sets. $L_{ns,AS}$ may also be referred to as a non-serving active set load. A non-served user is a user that is not served by the cell but has the cell in its active set.

The cell may have direct control over the loads of the users served by that cell, e.g., via absolute and relative grants to these users. The cell may have indirect control over the loads of the non-served users, e.g., via down relative grants to these users. $L_{ns,AS}$ may be computed separately in order to determine whether or not to send relative grants to these non-served users.

The total load of the cell, $L_{total\_cell}$, may be expressed as:

$$L_{total\_cell} = L_{in\text{-}cell} + L_{ns,AS} + L_{out}, \quad \text{Eq (7)}$$

where $L_{out}$ is the load of users in other cells and not having the cell in their active sets. $L_{out}$ may also be referred to as the outside load.

The total cell load may be expressed in terms of RoT, as follows:

$$L_{total\_cell} = \frac{I_0 - N_0}{I_0} = 1 - \frac{1}{RoT}. \quad \text{Eq (8)}$$

RoT may be measured as described below. $L_{total\_cell}$ may then be computed based on the measured RoT, as shown in equation (8). The outside load may then be computed as:

$$L_{out} = L_{total\_cell} - L_{in\text{-}cell} - L_{ns,AS}. \quad \text{Eq (9)}$$

The users may transmit pilot on the uplink in each slot of 0.667 milliseconds (ms). $L_{in\text{-}cell}$, $L_{ns,AS}$ and $L_{out}$ may be computed in each slot as described above. These quantities may be noisy and may be filtered with infinite impulse response (IIR) filters, as follows:

$$\tilde{L}_{in\text{-}cell}(n) = \left(1 - \frac{1}{T_{in\text{-}cell}}\right) \cdot \tilde{L}_{in\text{-}cell}(n-1) + \left(\frac{1}{T_{in\text{-}cell}}\right) \cdot L_{in\text{-}cell}(n), \quad \text{Eq (10)}$$

$$\tilde{L}_{ns,AS}(n) = \left(1 - \frac{1}{T_{ns,AS}}\right) \cdot \tilde{L}_{ns,AS}(n-1) + \left(\frac{1}{T_{ns,AS}}\right) \cdot L_{ns,AS}(n), \quad \text{Eq (11)}$$

and $$\tilde{L}_{out}(n) = \left(1 - \frac{1}{T_{out}}\right) \cdot \tilde{L}_{out}(n-1) + \left(\frac{1}{T_{out}}\right) \cdot L_{out}(n), \quad \text{Eq (12)}$$

where $L_{in\text{-}cell}(n)$, $L_{ns,AS}(n)$ and $L_{out}(n)$ are computed values in slot n, $\tilde{L}_{in\text{-}cell}(n)$, $\tilde{L}_{ns,AS}(n)$ and $\tilde{L}_{out}(n)$ are filtered values in slot n, and $T_{in\text{-}cell}$, $T_{ns,AS}$ and $T_{out}$ are time constants for $L_{in\text{-}cell}$, $L_{ns,AS}$ and $L_{out}$, respectively.

Figure 3:
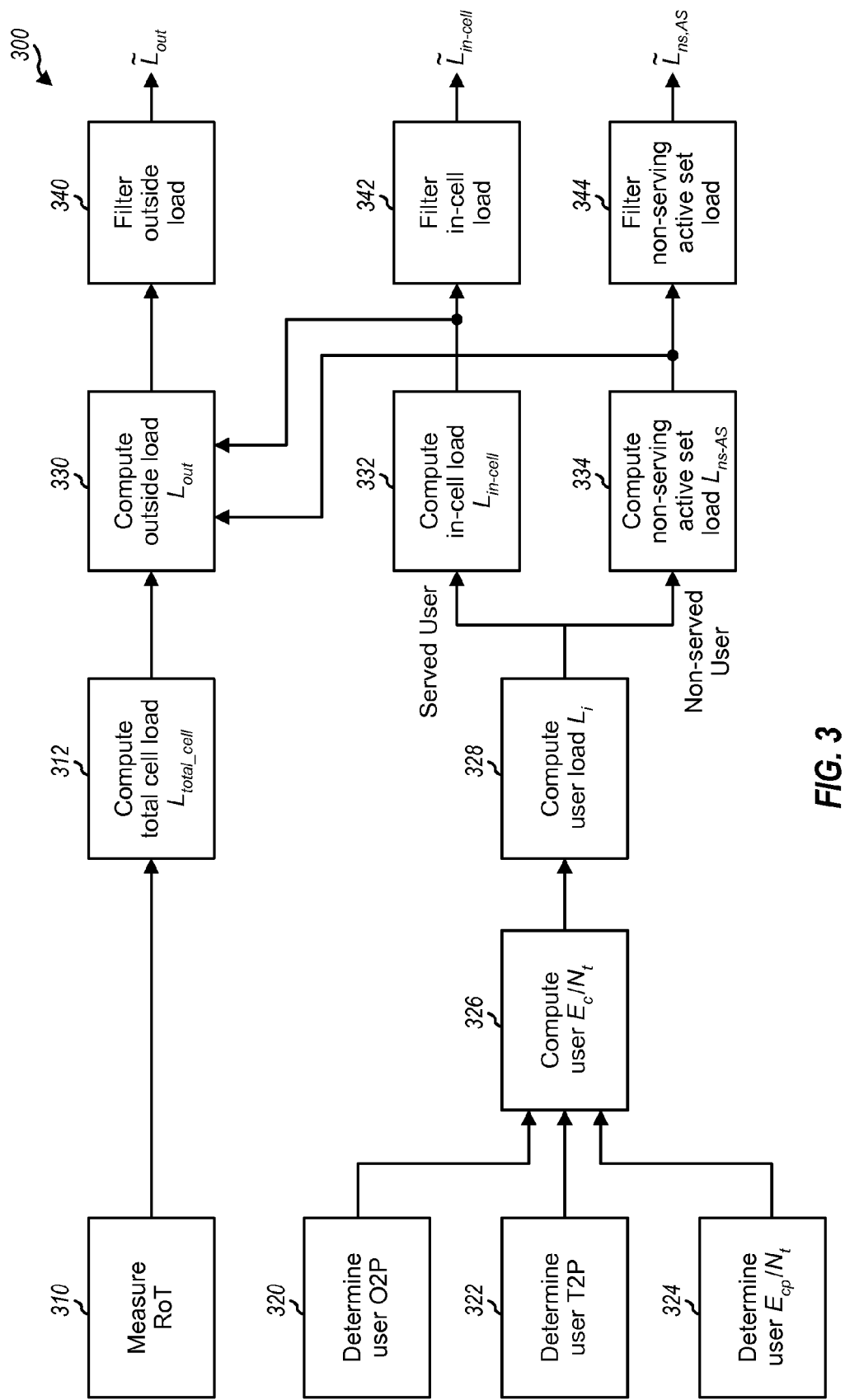
FIG. 3 shows a block diagram of a unit for computing various loads.

FIG. 3 shows a block diagram of a design of a unit 300 for computing $\tilde{L}_{in\text{-}cell}(n)$, $\tilde{L}_{ns,AS}(n)$ and $\tilde{L}_{out}(n)$. The RoT of the cell may be measured in block 310, as described below. The total cell load $L_{total\_cell}$ may be computed based on the measured RoT in block 312, e.g., as shown in equation (8).

For each user having the cell in its active set, the $O2P_i$ of the user may be determined in block 320, the $T2P_i$ of the user may be determined in block 322, and the $(E_{cp}/N_t)_i$ of the user may be determined in block 324. The $(E_c/N_t)_i$ of each user may be computed based on the $(E_{cp}/N_t)_i$, $O2P_i$ and $T2P_i$ in block 326, e.g., as shown in equation (1). The load of each user may be computed based on the $(E_c/N_t)_i$ in block 328, e.g., as shown in equation (2).

Each user that is served by the cell may be passed to block 332, and each user having the cell in its active set but not served by the cell may be passed to block 334. The in-cell load $L_{in\text{-}cell}$ may be computed in block 332 by accumulating the loads of all users served by the cell, e.g., as shown in equation (5). The non-serving active set load $L_{ns,AS}$ may be computed in block 334 by accumulating the loads of all non-served users, e.g., as shown in equation (6). The outside load $L_{out}$ may be computed in block 330 by subtracting the in-cell load $L_{in-cell}$ and the non-serving active set load $L_{ns,AS}$ from the total cell load $L_{total\_cell}$, e.g., as shown in equation (9). The outside load $L_{out}$ may be filtered in block 340, e.g., as shown in equation (12). The in-cell load $L_{in-cell}$ may be filtered in block 342, e.g., as shown in equation (10). The non-serving active set load $L_{ns,AS}$ may be filtered in block 344, e.g., as shown in equation (11). The filtered loads $\tilde{L}_{out}$, $\tilde{L}_{in-cell}$ and $\tilde{L}_{ns,AS}$ may be used for scheduling as described below.

In HSUPA, users may be scheduled in each transmission time interval (TTI), which may be 2 ms or 10 ms. The users may be scheduled for transmission on the uplink such that the RoT is at a target level, as shown in FIG. 2. This target RoT may be converted to a target total load as follows:

$$L_{total\_target} = 1 - \frac{1}{RoT\_target}, \quad \text{Eq (13)}$$

where $L_{total,target}$ is the target total load for the cell.

The available load for the cell, $L_{avail\_cell}$, may be expressed as:

$$L_{avail\_cell} = L_{total\_target} - \tilde{L}_{out} - \tilde{L}_{ns,AS}, \quad \text{Eq (14)}$$

where $\tilde{L}_{out}$ and $\tilde{L}_{ns,AS}$ are the current filtered values of $L_{out}$ and $L_{ns,AS}$, respectively.

The users in the cell may be scheduled based on the available load in various manners. In one design, the available load may be allocated to different classes or types of transmissions in the following order:

1. Transmissions on dedicated channels assigned to the users,
2. Retransmissions of pending data with HARQ,
3. Transmissions autonomously sent by the users without requiring scheduling, and
4. Transmissions of new data.

A user may be assigned one or more dedicated channels to transmit data, signaling, pilot, etc. A user may also be allowed to transmit data at any time, up to a predetermined autonomous data rate, without having to be scheduled. This autonomous data rate may be preconfigured and may be used to send delay sensitive data (e.g., voice data) and/or small amount of data. Autonomous transmission of such data may reduce scheduling overhead and latency. A user may also have a pending packet that has not been decoded correctly by the cell and may need to send a retransmission of the packet.

The load of the dedicated channels for all users served by the cell may be determined based on the $(E_{cp}/N_t)_i$ and the O2P$_i$ and T2P$_i$ of each user. Users with pending packets may be identified, and the load of retransmissions of pending packets from these users may be determined. The load of autonomous transmissions by users may also be determined. The load available for scheduling, $L_{avail\_sched}$, may then be expressed as:

$$L_{avail\_sched} = L_{avail\_cell} - L_{DPCH} - L_{retran} - L_{autonomous}, \quad \text{Eq (15)}$$

where
$L_{DPCH}$ is the load of transmissions on the dedicated channels,
$L_{retran}$ is the load of retransmissions of pending packets, and
$L_{autonomous}$ is the load of autonomous transmissions.

The available load $L_{avail\_sched}$ may be allocated to users requesting transmission on the uplink based on various scheduling schemes. In one scheduling scheme, the requesting users may be prioritized based on various factors such as their supported data rates, average throughputs, quality of service (QoS) requirements, etc. In one design, the priority of user i may be expressed as:

$$Priority_i = \frac{R_{supported,i}}{TP_i}, \quad \text{Eq (16)}$$

where
$R_{supported,i}$ is the maximum supported data rate for user i,
$TP_i$ is the average throughput for user i, and
$Priority_i$ is the priority of user i.

The users may also be prioritized in other manners and/or based on other parameters. In any case, the users may be sorted based on their priorities. The available load $L_{avail\_sched}$ may then be allocated to the sorted users, one at a time, starting with the highest priority user.

For the highest priority user to be scheduled first, the maximum supported data rate $R_{supported,i}$ for the user may be computed based on the queue size and power headroom information for the user. A data rate $R_{sched,i}$ may be selected for the user based on the maximum supported data rate $R_{supported,i}$ and the available load $L_{avail\_sched}$. The scheduled data rate is equal to or less than the maximum supported data rate and is further limited by the available load. The load of the scheduled user, $L_{sched,i}$, may be computed based on the scheduled data rate $R_{sched,i}$ and the $(E_{cp}/N_t)_i$ of the user. Different supported data rates may be associated with different $E_c/N_t$ values and hence different T2P values. The T2P value for the scheduled data rate may be determined, e.g., via a look-up table. The load of the scheduled user may then be determined based on the T2P value for the scheduled data rate and the $(E_{cp}/N_t)_i$ of the user, e.g., as shown in equations (1) and (2). The available load $L_{avail\_sched}$ may then be reduced by the load $L_{sched,i}$ of the scheduled user. The next highest priority user may be scheduled in similar manner. The process may be repeated until all requesting users have been scheduled or the available load $L_{avail\_sched}$ is zero or too small.

Figure 4:
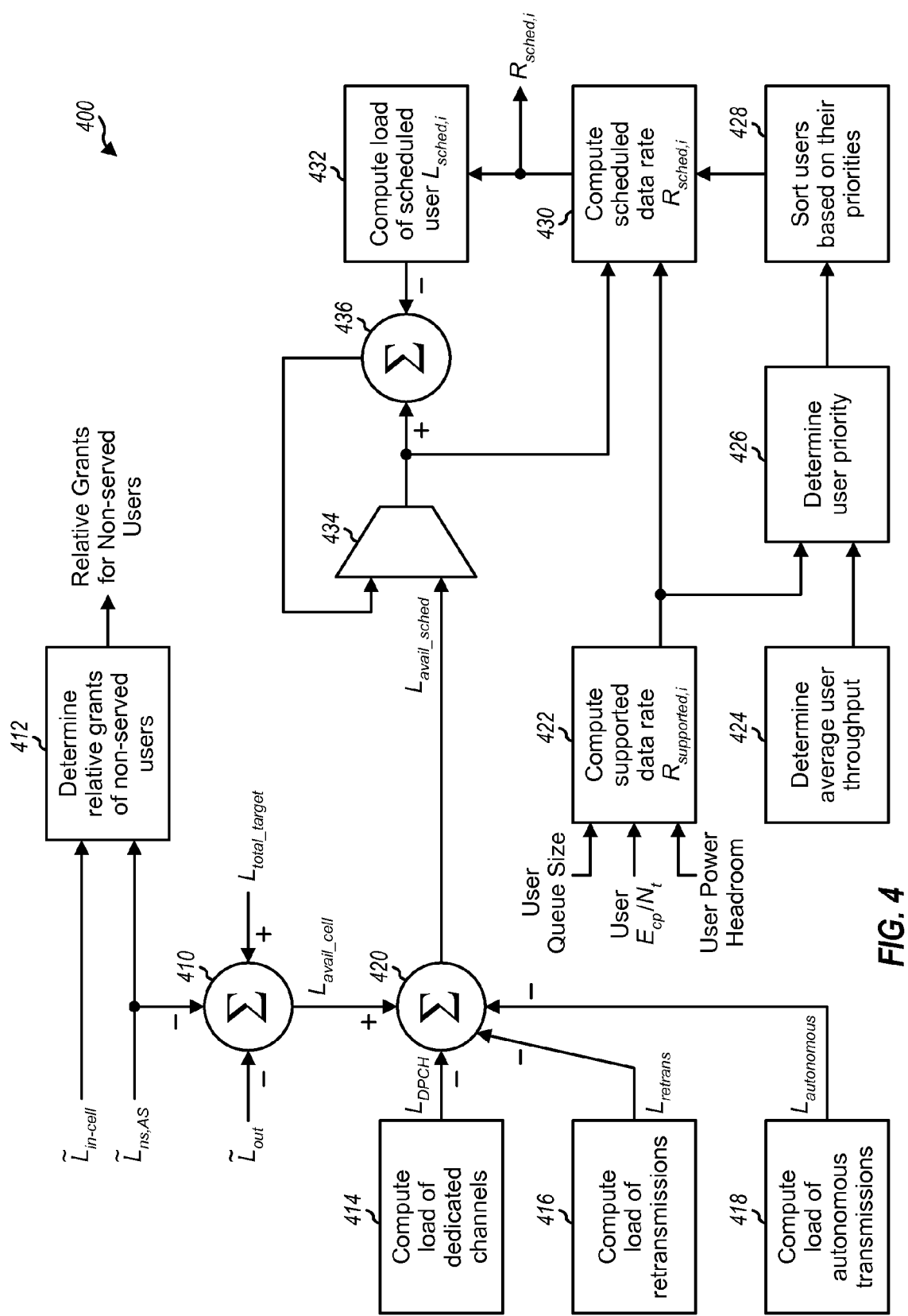
FIG. 4 shows a block diagram of a unit for scheduling users on the uplink.

FIG. 4 shows a block diagram of a design of a unit 400 for scheduling users on the uplink. The filtered outside load $\tilde{L}_{out}$ and the filtered non-serving active set load $\tilde{L}_{ns,AS}$ may be subtracted from the target total load $L_{total\_target}$ by a summer 410 to obtain the available load $L_{avail\_cell}$ for the cell, e.g., as shown in equation (14). The load $L_{DPCH}$ of transmissions on the dedicated channels may be computed in block 414. The load $L_{retran}$ of retransmissions of pending packets may be computed in block 416. The load $L_{autonomous}$ of autonomous transmissions may be computed in block 418. The dedicated channel load $L_{DPCH}$, the retransmission load $L_{retran}$, and the autonomous transmission load $L_{autonomous}$ may be subtracted from the available cell load $L_{avail\_cell}$ by a summer 420 to obtain the available load $L_{avail\_sched}$ for scheduling users.

For each user requesting transmission on the uplink, the maximum supported data rate $R_{supported,i}$ may be computed by block 422 based on the queue size, power headroom, and $(E_{cp}/N_t)_i$ for the user. The average throughput of each user may be updated in block 424 whenever the user is scheduled. The priority of each user may be determined in block 426, e.g., as shown in equation (16). The requesting users may be sorted based on their priorities in block 428. Thereafter, for each user to be scheduled, a scheduled data rate $R_{sched,i}$ may be determined for the user by block 430 based on the maximum supported data rate for the user and the currently available load from a selector 434. The load $L_{sched,i}$ of the scheduled user may be determined by block 432 based on the scheduled data rate and other pertinent information. Selector 434 provides the available load $L_{avail\_sched}$ from summer 420 for the first user and provides the updated available load from a summer 436 for each subsequent user. Summer 436 subtracts the scheduled user load $L_{sched,i}$ from the available load $L_{avail\_sched}$ to update the available load for remaining users.

The cell may decrease the data rates of non-served users having the cell in their active sets but not served by the cell. In one design, relative grants to decrease the data rates of the non-served users may be generated by block 412 if the following conditions are met:

$$\tilde{L}_{ns,AS} + \tilde{L}_{cell} > L_{thresh,AS} \text{ AND } \tilde{L}_{ns,AS} > K_{ns,AS} \cdot \tilde{L}_{cell}, \quad \text{Eq (17)}$$

where $L_{thresh,AS}$ is a threshold and $K_{ns,AS}$ is a ratio used to reduce the data rates of the non-served users. The data rates of the non-served users may also be reduced based on other conditions and/or parameters.

In the design described above, the non-serving active set load $L_{ns,AS}$ may be determined separately and used to send relative grants to the non-served users. Both $L_{ns,AS}$ and $L_{out}$ may be subtracted from the target total load $L_{total\_target}$ to obtain the available cell load $L_{avail\_cell}$, e.g., as shown in equation (14). $L_{ns,AS}$ and $L_{out}$ may be considered as the total load of all users not served by the cell.

In another design, the in-cell load $L_{in-cell}$ may be determined, e.g., as shown in equation (5), but the non-serving active set load $L_{ns,AS}$ is not determined. The outside load $L_{out}'$ may then be computed as:

$$L_{out}' = L_{total\_cell} - L_{in-cell}. \quad \text{Eq (18)}$$

$L_{out}'$ includes both the non-serving active set load $L_{ns,AS}$ and the outside load $L_{out}$. $L_{out}'$ may be filtered (e.g., with an IIR filter) to obtain $\tilde{L}_{out}'$. The available cell load $L_{avail\_cell}$ may then be determined based on $L_{total\_target}$ and $\tilde{L}_{out}'$, as follows $$L_{avail\_cell} = L_{total\_target} - \tilde{L}_{out}'. \quad \text{Eq (19)}$$

$L_{avail\_cell}$ may then be allocated to the users as described above.

In another scheduling scheme, each requesting user (or each user scheduled in a previous TTI) may be assigned a reserved data rate that may be lower than the maximum supported data rate for that user. In one design, the reserved data rate for each user may be one data rate below the last scheduled data rate for that user. The load of the reserved data rates for all users may be computed and subtracted from the available load $L_{avail\_sched}$. The remaining available load may then be allocated to the requesting users, e.g., as described above. This scheduling scheme may ensure that the requesting users (or the previously scheduled users) are allocated at least a fraction of their maximum supported data rates.

Other scheduling schemes may also be used to allocate the available load $L_{avail\_sched}$ to the requesting users. For example, the available load may be allocated based on a round robin scheme, a proportional fairness scheme based on reported power headroom, a proportional fairness scheme based on reported power headroom and power control, a proportional fairness scheme based on reported power headroom and downlink received signal quality, etc.

The RoT of the cell may be measured in order to compute the total cell load $L_{total\_cell}$. The RoT may be expressed as:

$$RoT = \frac{I_0}{N_0}. \quad \text{Eq (20)}$$

The total noise and interference $I_0$ may be readily measured as the total received power at the cell. The thermal noise $N_0$ may be measured in several manners. In one design, $N_0$ may be measured during a silence interval in which no users transmit on the uplink. $N_0$ may then be measured as the total received power at the cell during the silence interval. In another design, the total received power in a sideband between two WCDMA carriers may be measured and used to estimate $N_0$. For example, samples prior to a pulse-shaping filter at the cell may be transformed with a fast Fourier transform (FFT) to obtain a power spectral density of both inband and sideband. $N_0$ may then be determined based on the portion of the power spectral density for the sideband. $N_0$ may also be measured in other manners. In any case, the RoT of the cell may be computed based on the measured $I_0$ and the measured $N_0$.

The scheduling techniques described herein may provide certain advantages. First, a more accurate available cell load $L_{avail\_cell}$ may be obtained by determining the outside load $L_{out}$ based on RoT measurement. This may allow the cell to operate closer to the target total load $L_{total\_target}$, which may improve capacity. The more accurate available cell load $L_{avail\_cell}$ may also allow the cell to operate at a higher target total load while still ensuring stability.

Figure 5:
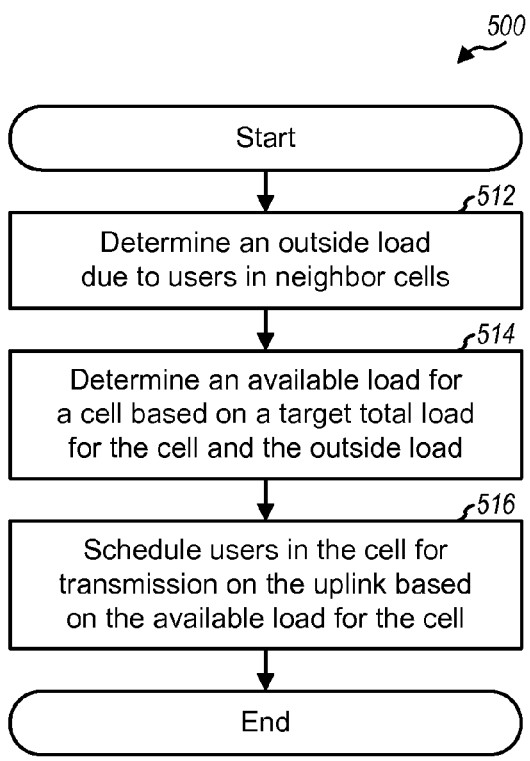
FIG. 5 shows a process for scheduling users in a cell.

FIG. 5 shows a design of a process 500 for scheduling users in a cell. Process 500 may be performed by a scheduler, which may be located at Node B 110 or network controller 130. An outside load due to users in neighbor cells and not served by the cell may be determined (block 512). The outside load may correspond to $L_{out}$ in equation (9) or $L_{out}'$ in equation (18). An available load for the cell may be determined based on a target total load for the cell and the outside load (block 514). The target total load for the cell may be determined based on a target RoT, e.g., as shown in equation (13). The outside load may be filtered to obtain a filtered outside load, and the available load may be determined based on the target total load and the filtered outside load. Users in the cell may be scheduled for transmission on the uplink based on the available load for the cell (block 516).

Figure 6:
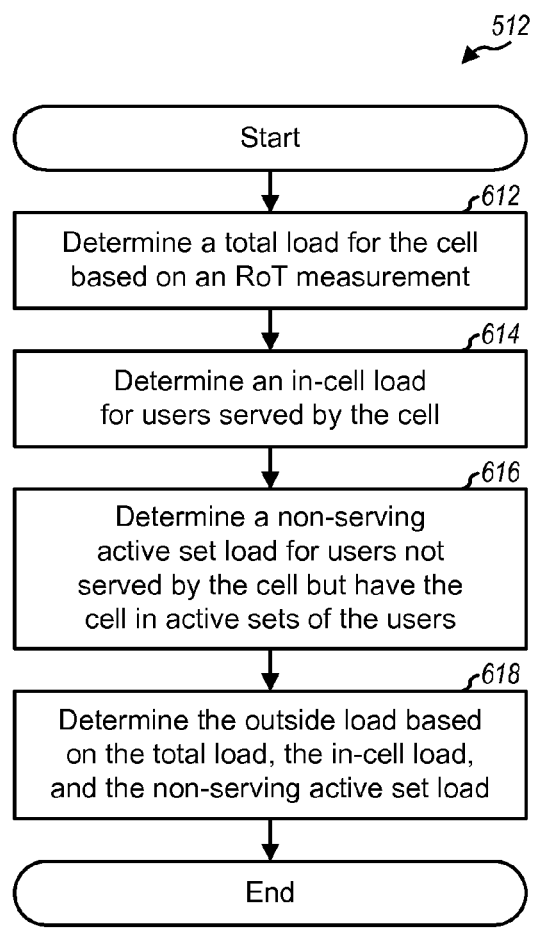
FIG. 6 shows a process for determining the outside load.

FIG. 6 shows a design of block 512 in FIG. 5 to determine the outside load. A total load for the cell may be determined based on an RoT measurement (block 612). An in-cell load for users served by the cell may be determined based on uplink transmissions received from these users (block 614). A non-serving active set load for non-served users that are not served by the cell but have the cell in their active sets may also be determined (block 616). The outside load may then be determined based on the total load, the in-cell load, and possibly the non-serving active set load, e.g., as shown in equation (14) or (19) (block 618).

In one design of block 612, the RoT measurement may be obtained based on a thermal noise measurement and a total received power measurement for the cell. The thermal noise measurement may be obtained based on a signal measurement for a sideband between carriers, a signal measurement made during a silence period with no users transmitting on the uplink, etc.

In one design of block 614, a load of each user served by the cell may be determined based on a total-energy-per-chip-to-total-noise ratio of the user, e.g., as shown in equation (2). The total-energy-per-chip-to-total-noise ratio of the user may be determined based on a pilot-energy-per-chip-to-total-noise ratio, a traffic-to-pilot ratio, and possibly an overhead-to-pilot ratio for the user, e.g., as shown in equation (1). The in-cell load may be determined based on the loads of all users served by the cell, e.g., as shown in equation (5).

In one design of block 516 in FIG. 5, the available load may first be allocated to transmissions on dedicated channels assigned to users, retransmissions of pending packets, autonomous transmissions by the users, and/or other types of transmissions before new transmissions. A load due to the dedicated channels may be determined and subtracted from the available load. A load due to the retransmissions may be determined and subtracted from the available load. A load due to the autonomous transmissions may be determined and subtracted from the available load. The updated available load may then be allocated to the users in the cell.

FIG. 7 shows a design of a process 700 for scheduling users based on the available load. Process 700 may be used for block 516 in FIG. 5. Priorities of the users to be scheduled in the cell may be determined, e.g., as shown in equation (16) or based on some other scheme (block 712). The users may be sorted based on their priorities (block 714). The available load may then be allocated to the sorted users, one user at a time. The highest priority user may be selected first (block 716). A data rate may be assigned to the user, e.g., based on a power headroom and a queue size of the user, the available load, etc. (block 718). A load of the user may be determined based on the assigned data rate and other pertinent information (block 720). The available load may then be updated by subtracting the load of the user (block 722). If any available load is still left and if all users have not been scheduled, as determined in block 724, then the process returns to block 716 to schedule the next highest priority user. Otherwise, the process terminates. Relative grants may also be generated for non-served users based on the non-serving active set load and the in-cell load, e.g., as shown in equation (17).

In another design, reserved data rates may be assigned to the users. The load due to the reserved data rates may be determined and subtracted from the available load. The updated available load may then be allocated to the users.

FIG. 8 shows a design of a process 800 performed by a UE. The UE may send a request (e.g., a scheduling information message) for transmission on the uplink to a cell (block 812). The UE may receive a grant for transmission on the uplink from the cell, with the grant being determined based on an available load for the cell (block 814). The available load for the cell may be determined based on a target total load for the cell and an outside load due to users not in the cell. The UE may send a transmission on the uplink in accordance with the grant (block 816).

The UE may send at least one dedicated channel to the cell. The available load may be determined based further on the load due to the dedicated channels of all users in the cell. The UE may send a retransmission of a pending packet to the cell. The available load may be determined based further on the load due to retransmissions of all users in the cell. The UE may autonomously send a transmission to the cell. The available load may be determined based further on the load due to autonomous transmissions of all users in the cell.

Figure 9:
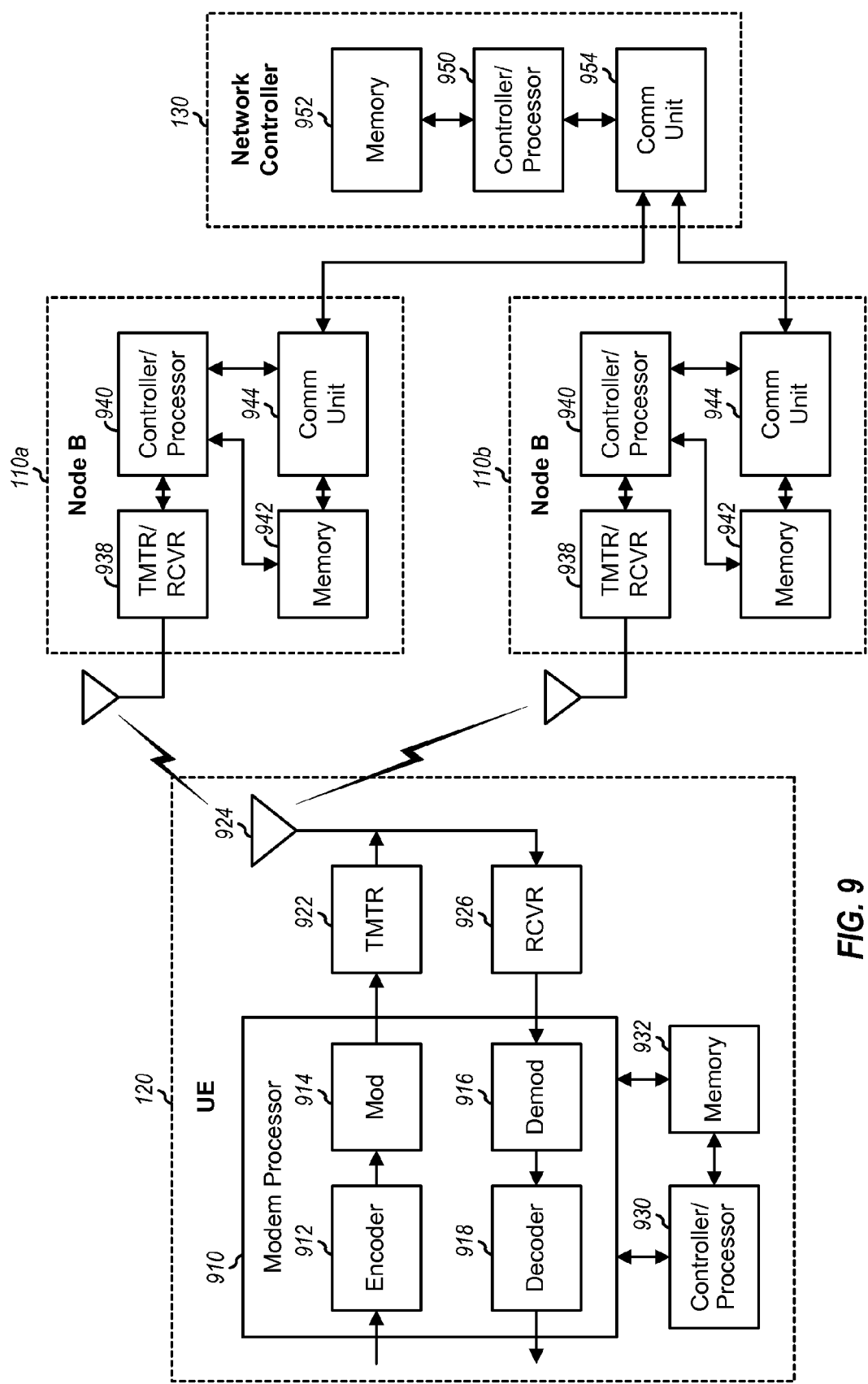
FIG. 9 shows a block diagram of the UE, two Node Bs, and a network controller.

FIG. 9 shows a block diagram of a design of UE 120, which may be one of the UEs in FIG. 1. On the uplink, an encoder 912 may receive data and signaling (e.g., requests or SI messages) to be sent by UE 120 on the uplink. Encoder 912 may process (e.g., format, encode, and interleave) the data and signaling. A modulator (Mod) 914 may further process (e.g., modulate, channelize, and scramble) the encoded data and signaling and provide output chips. A transmitter (TMTR) 922 may condition (e.g., convert to analog, filter, amplify, and frequency upconvert) the output chips and generate an uplink signal, which may be transmitted via an antenna 924 to one or more Node Bs.

On the downlink, antenna 924 may receive downlink signals transmitted by one or more Node Bs. A receiver (RCVR) 926 may condition (e.g., filter, amplify, frequency downconvert, and digitize) the received signal from antenna 924 and provide samples. A demodulator (Demod) 916 may process (e.g., descramble, channelize, and demodulate) the samples and provide symbol estimates. A decoder 918 may further process (e.g., deinterleave and decode) the symbol estimates and provide decoded data and signaling (e.g., absolute and relative grants) sent to UE 120. Encoder 912, modulator 914, demodulator 916, and decoder 918 may be implemented by a modem processor 910. These units may perform processing in accordance with the radio technology (e.g., W-CDMA) used by the wireless system.

A controller/processor 930 may direct the operation of various units at UE 120. Controller/processor 930 may implement process 800 in FIG. 8 and/or other processes for the techniques described herein. Memory 932 may store program codes and data for UE 120.

FIG. 9 also shows a block diagram of a design of Node Bs 110a and 110b in FIG. 1. Node B 110a may support a serving cell for UE 120, and Node B 110b may support a neighbor cell or an non-serving active set cell for UE 120. At each Node B 110, a transmitter/receiver 938 may support radio communication with UE 120 and other UEs. A controller/processor 940 may perform various functions for communication with the UEs. For uplink transmission, the uplink signal from UE 120 may be received and conditioned by receiver 938 and further processed by controller/processor 940 to recover the uplink data and signaling sent by the UE. For downlink transmission, data and signaling may be processed by controller/processor 940 and conditioned by transmitter 938 to generate a downlink signal, which may be transmitted to the UEs. Memory 942 may store program codes and data for the Node B. A communication (Comm) unit 944 may support communication with network controller 130.

FIG. 9 also shows a block diagram of a design of network controller 130. At network controller 130, a controller/processor 950 may perform various functions to support communication services for the UEs. Memory 952 may store program codes and data for network controller 130. A communication unit 954 may support communication with Node Bs 110.

The scheduling of users may be performed by Node B 110a for the serving cell, network controller 130, or some other entity. Controller/processor 940 or 950 may implement process 500 in FIG. 5, process 512 in FIG. 6, process 700 in FIG. 7, and/or other processes for the techniques described herein. Controller/processor 940 or 950 may also implement unit 300 in FIG. 3 and/or unit 400 in FIG. 4.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. An apparatus for wireless communication, comprising: at least one processor; and a memory coupled to the at least one processor, the memory storing instructions for execution by the at least one processor, wherein the instructions cause the at least one processor to determine, with respect to a cell, an outside load based on a total load for the cell determined from a rise-over-thermal (RoT) measurement, an in-cell load for users served by the cell determined from uplink transmissions received from the users, and a non-serving active set load due to users in neighbor cells that have the cell in their active sets, to determine an available load for the cell based on a target total load for the cell from a target RoT and the outside load, and to schedule users in the cell for transmission on uplink based on the available load for the cell; wherein the outside load is the load of users in other cells and not having the cell in their active sets.

2. The apparatus of claim 1, wherein the non-serving active set load comprises non-served users not served by the cell but having the cell in active sets of the users.

3. The apparatus of claim 1, wherein the at least one processor is configured to filter the outside load to obtain a filtered outside load, and to determine the available load based on the target total load and the filtered outside load.

4. The apparatus of claim 1, wherein the at least one processor is configured to determine a load of each user served by the cell, and to determine the in-cell load based on loads of all users served by the cell.

5. The apparatus of claim 4, wherein the at least one processor is configured to determine a pilot-energy-per-chip-to-total-noise ratio of each user served by the cell, to determine a total-energy-per-chip-to-total-noise ratio of each user based on the pilot-energy-per-chip-to-total-noise ratio and at least one of a traffic-to-pilot ratio and an overhead-to-pilot ratio for the user, and to determine the load of each user based on the total-energy-per-chip-to-total-noise ratio of the user.

6. The apparatus of claim 2, wherein the at least one processor is configured to generate relative grants for the non-served users based on the non-serving active set load and the in-cell load.

7. The apparatus of claim 1, wherein the at least one processor is configured to obtain a thermal noise measurement, to obtain a total received power measurement, and to obtain the RoT measurement based on the thermal noise measurement and the total received power measurement.

8. The apparatus of claim 7, wherein the at least one processor is configured to obtain the thermal noise measurement based on a signal measurement for a sideband between carriers.

9. The apparatus of claim 7, wherein the at least one processor is configured to obtain the thermal noise measurement based on a signal measurement made during a silence period with no users transmitting on the uplink.

10. The apparatus of claim 1, wherein the at least one processor is configured to allocate the available load to dedicated channels assigned to users before new transmissions, to determine a load due to the dedicated channels, and to update the available load by subtracting the load due to the dedicated channels.

11. The apparatus of claim 1, wherein the at least one processor is configured to allocate the available load to retransmissions before new transmissions, to determine a load due to the retransmissions, and to update the available load by subtracting the load due to the retransmissions.

12. The apparatus of claim 1, wherein the at least one processor is configured to allocate the available load to autonomous transmissions by users before new transmissions, to determine a load due to the autonomous transmissions, and to update the available load by subtracting the load due to the autonomous transmissions.

13. The apparatus of claim 1, wherein the at least one processor is configured to determine priorities of the users to be scheduled in the cell, to sort the users based on the priorities, and to allocate the available load to the sorted users, one user at a time, starting with a highest priority user.

14. The apparatus of claim 1, wherein the at least one processor is configured to assign a data rate to a user being scheduled, to determine a load of the user based on the assigned data rate, and to update the available load by subtracting the load of the user.

15. The apparatus of claim 14, wherein the at least one processor is configured to determine the assigned data rate for the user based on a power headroom and a queue size of the user.

16. The apparatus of claim 1, wherein the at least one processor is configured to assign reserved data rates to the users to be scheduled in the cell, to determine a load due to the reserved data rates, to update the available load by subtracting the load due to the reserved data rates, and to allocate the updated available load to the users to be scheduled in the cell.

17. The apparatus of claim 1, wherein the at least one processor is configured to schedule the users in the cell for transmission on the uplink with High-Speed Uplink Packet Access (HSUPA).

18. A method for wireless communication, comprising: determining, with respect to a cell, an outside load based on a total load for the cell determined from a rise-over-thermal (RoT) measurement, an in-cell load for users served by the cell determined from uplink transmissions received from the users, and a non-serving active set load due to users in neighbor cells that have the cell in their active sets; determining an available load for the cell based on a target total load for the cell from a target RoT and the outside load; and scheduling users in the cell for transmission on uplink based on the available load for the cell; wherein the outside load is the load of users in other cells and not having the cell in their active sets.

19. The method of claim 18, wherein the non-serving active set load comprises users not served by the cell but having the cell in active sets of the users.

20. The method of claim 18, wherein the determining the in-cell load comprises
determining a load of each user served by the cell, and
determining the in-cell load based on loads of all users served by the cell.

21. The method of claim 18, further comprising:
obtaining a thermal noise measurement;
obtaining a total received power measurement; and
obtaining the RoT measurement based on the thermal noise measurement and the total received power measurement.

22. The method of claim 18, wherein the scheduling the users in the cell comprises
assigning a data rate to a user being scheduled,
determining a load of the user based on the assigned data rate, and
updating the available load by subtracting the load of the user.

23. An apparatus for wireless communication, comprising: means for determining, with respect to a cell, an outside load based on a total load for the cell determined from a rise-over-thermal (ROT) measurement, an in-cell load for users served by the cell determined from uplink transmissions received from the users, and a non-serving active set load due to users in neighbor cells that have the cell in their active sets; means for determining an available load for the based on a target total load for the cell from a target RoT and the outside load; and means for scheduling users in the cell for transmission on uplink based on the available load for the cell; wherein the outside load is the load of users in other cells and not having the cell in their active sets.

24. The apparatus of claim 23, wherein the non-serving active set load comprises users not served by the cell but having the cell in active sets of the users.

25. The apparatus of claim 23, wherein the means for determining the in-cell load comprises
means for determining a load of each user served by the cell, and
means for determining the in-cell load based on loads of all users served by the cell.

26. The apparatus of claim 23, further comprising:
means for obtaining a thermal noise measurement;
means for obtaining a total received power measurement; and
means for obtaining the RoT measurement based on the thermal noise measurement and the total received power measurement.

27. The apparatus of claim 23, wherein the means for scheduling the users in the cell comprises
means for assigning a data rate to a user being scheduled,
means for determining a load of the user based on the assigned data rate, and
means for updating the available load by subtracting the load of the user.

28. A non-transitory computer-readable medium containing instructions stored thereon, comprising: code for causing at least one computer to determine, with respect to a cell, an outside load based on a total load for the cell determined from a rise-over-thermal (ROT) measurement, an in-cell load for users served by the cell determined from uplink transmissions received from the users, and a non-serving active set load due to users in neighbor cells that have the cell in their active sets; code for causing the at least one computer to determine an available load for the based on a target total load for the cell from a target RoT and the outside load; and code for causing the at least one computer to schedule users in the cell for transmission on uplink based on the available load for the cell; wherein the outside load is the load of users in other cells and not having the cell in their active sets.

29. The non-transitory computer-readable medium of claim 28, further comprising:
code for causing the at least one computer to assign a data rate to a user being scheduled;
code for causing the at least one computer to determine a load of the user based on the assigned data rate; and
code for causing the at least one computer to update the available load by subtracting the load of the user.

30. An apparatus for wireless communication, comprising: at least one processor; and a memory coupled to the at least one processor, the memory storing instructions for execution by the at least one processor, wherein the instructions cause the at least one processor to send a request for transmission on uplink to a cell, to receive a grant for transmission on the uplink from the cell, and to send a transmission on the uplink in accordance with the grant, the grant being determined based on an available load for the cell, the available load being determined based on a target total load for the cell from a target rise-over-thermal and an outside load based on a total load for the cell determined from an RoT measurement, an in-cell load for users served by the cell determined from uplink transmissions received from the users, and a non-serving active set load due to users not in the cell that have the cell in their active sets; wherein the outside load is the load of users in other cells and not having the cell in their active sets.

31. The apparatus of claim 30, wherein the at least one processor is configured to send at least one dedicated channel to the cell, and wherein the available load is determined based further on a load due to dedicated channels of users in the cell.

32. The apparatus of claim 30, wherein the at least one processor is configured to send a retransmission of a pending packet to the cell, and wherein the available load is determined based further on a load due to retransmissions of users in the cell.

33. The apparatus of claim 30, wherein the at least one processor is configured to autonomously send a transmission to the cell without being scheduled, and wherein the available load is determined based further on a load due to autonomous transmissions of users in the cell.

34. A method for wireless communication, comprising: sending a request for transmission on uplink to a cell; receiving a grant for transmission on the uplink from the cell, the grant being determined based on an available load for the cell, the available load being determined based on a target total load for the cell from a target rise-over-thermal (ROT) and an outside load based on a total load for the cell determined from an RoT measurement, an in-cell load for users served by the cell determined from uplink transmissions received from the users, and a non-serving active set load due to users not in the cell that have the cell in their active sets; and sending a transmission on the uplink in accordance with the grant; wherein the outside load is the load of users in other cells and not having the cell in their active sets.

35. The method of claim 34, further comprising:
sending at least one dedicated channel to the cell, and wherein the available load is determined based further on a load due to dedicated channels of users in the cell.

36. The method of claim 34, further comprising:
sending a retransmission of a pending packet to the cell, and wherein the available load is determined based further on a load due to retransmissions of users in the cell.

37. The method of claim 34, further comprising:
autonomously sending a transmission to the cell without being scheduled, and wherein the available load is determined based further on a load due to autonomous transmissions of users in the cell.

38. An apparatus for wireless communication, comprising: means for sending a request for transmission on uplink to a cell; means for receiving a grant for transmission on the uplink from the cell, the grant being determined based on an available load for the cell, the available load being determined based on a target total load for the cell from a target rise-over-thermal (ROT) and an outside load based on a total load for the cell determined from an RoT measurement, an in-cell load for users served by the cell determined from uplink transmissions received from the users, and a non-serving active set load due to users not in the cell that have the cell in their active sets; and means for sending a transmission on the uplink in accordance with the grant; wherein the outside load is the load of users in other cells and not having the cell in their active sets.

39. A non-transitory computer-readable medium containing instructions stored thereon, comprising: code for causing at least one computer to send a request for transmission on uplink to a cell; code for causing at least one computer to receive a grant for transmission on the uplink from the cell, the grant being determined based on an available load for the cell, the available load being determined based on a target total load for the cell from a target rise-over-thermal (RoT) and an outside load based on a total load for the cell determined from an RoT measurement, an in-cell load for users served by the cell determined from uplink transmissions received from the users, and a non-serving active set load due to users not in the cell that have the cell in their active sets; and code for causing at least one computer to send a transmission on the uplink in accordance with the grant; wherein the outside load is the load of users in other cells and not having the cell in their active sets.

40. The method of claim 18, wherein the outside load only includes load caused by users outside of a serving area of the cell.

* * * * *